(12) United States Patent
Della-Libera et al.

(10) Patent No.: US 7,640,573 B2
(45) Date of Patent: Dec. 29, 2009

(54) GENERIC SECURITY CLAIM PROCESSING MODEL

(75) Inventors: Giovanni M. Della-Libera, Seattle, WA (US); Vijay K. Gajjala, Sammamish, WA (US); Tomasz Janczuk, Sammamish, WA (US); John R. Lambert, Bellevue, WA (US); Elliot Waingold, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1004 days.

(21) Appl. No.: 10/780,274

(22) Filed: Feb. 16, 2004

(65) Prior Publication Data

US 2005/0182941 A1 Aug. 18, 2005

(51) Int. Cl.
*G06F 17/00* (2006.01)
*G06F 17/30* (2006.01)
*G06F 7/04* (2006.01)
*G06F 21/00* (2006.01)
*H04L 29/06* (2006.01)
*H04L 9/32* (2006.01)
*H04N 7/16* (2006.01)

(52) U.S. Cl. .................. 726/1; 726/2; 726/26; 713/182
(58) Field of Classification Search ............... 726/1–4, 726/16, 17, 21, 27, 30, 9, 20, 26; 713/155–157, 713/159, 168–170, 172, 173; 380/59
See application file for complete search history.

(56) References Cited

U.S. PATENT DOCUMENTS

| | | | |
|---|---|---|---|
| 5,446,903 A | 8/1995 | Abraham et al. | |
| 5,638,448 A * | 6/1997 | Nguyen | 380/29 |
| 5,838,903 A | 11/1998 | Blakely, III et al. | |
| 5,850,446 A | 12/1998 | Berger et al. | |
| 5,915,024 A | 6/1999 | Kitaori et al. | |
| 5,996,076 A | 11/1999 | Rowney et al. | |
| 6,002,767 A | 12/1999 | Kramer | |
| 6,014,666 A | 1/2000 | Helland et al. | |
| 6,058,426 A | 5/2000 | Godwin et al. | |
| 6,061,684 A | 5/2000 | Glasser et al. | |
| 6,088,805 A | 7/2000 | Davis et al. | |
| 6,141,754 A * | 10/2000 | Choy | 726/1 |
| 6,163,772 A | 12/2000 | Kramer et al. | |
| 6,233,576 B1 | 5/2001 | Lewis | |

(Continued)

OTHER PUBLICATIONS

RFC 1808, R. Fielding, Relative Uniform Resource Locators. Jun. 1995.*

(Continued)

*Primary Examiner*—Nasser G Moazzami
*Assistant Examiner*—Oscar A Louie
(74) *Attorney, Agent, or Firm*—Lee & Hayes, PLLC

(57) ABSTRACT

A system for processing multiple types of security schemes includes a server having a claims engine that extracts claim(s) from security token(s) and maps extracted claims to other claims. The term claim as used in this context is a statement about a token's subject. The claims engine can extract claim (s) from one or more different types of security tokens corresponding to the multiple security schemes. These extracted claim(s) can then be selectively mapped to other claims using mapping information that is accessible to the server. The security decision can then be based on the extracted and/or derived claim(s) rather than tokens. This system can thereby support multiple security schemes and simplify the security process for the user.

39 Claims, 4 Drawing Sheets

U.S. PATENT DOCUMENTS

| | | | |
|---|---|---|---|
| 6,253,027 | B1 | 6/2001 | Weber et al. |
| 6,279,111 | B1 | 8/2001 | Jensenworth et al. |
| 6,381,602 | B1 | 4/2002 | Shoroff et al. |
| 6,405,212 | B1 | 6/2002 | Samu et al. |
| 6,412,070 | B1 | 6/2002 | Van Dyke et al. |
| 6,434,607 | B1 | 8/2002 | Haverstock et al. |
| 6,446,206 | B1 | 9/2002 | Feldbaum |
| 6,449,633 | B1 | 9/2002 | Van et al. |
| 6,473,800 | B1 | 10/2002 | Jerger et al. |
| 6,487,600 | B1 * | 11/2002 | Lynch ..................... 709/229 |
| 6,513,721 | B1 | 2/2003 | Salmre et al. |
| 6,625,603 | B1 | 9/2003 | Garg et al. |
| 6,658,573 | B1 | 12/2003 | Bischof et al. |
| 6,754,829 | B1 * | 6/2004 | Butt et al. ..................... 726/8 |
| 6,807,636 | B2 | 10/2004 | Hartman et al. |
| 6,854,056 | B1 * | 2/2005 | Benantar et al. ............ 713/156 |
| 6,915,338 | B1 | 7/2005 | Hunt et al. |
| 6,931,532 | B1 | 8/2005 | Davis et al. |
| 7,010,681 | B1 | 3/2006 | Fletcher et al. |
| 7,024,662 | B2 | 4/2006 | Elvanoglu et al. |
| 7,062,566 | B2 | 6/2006 | Amara et al. |
| 7,065,706 | B1 | 6/2006 | Sankar |
| 7,535,488 | B2 | 5/2009 | Wakao et al. |
| 2002/0040431 | A1 | 4/2002 | Kato et al. |
| 2004/0148508 | A1 | 7/2004 | Alev et al. |
| 2004/0181756 | A1 | 9/2004 | Berringer et al. |

OTHER PUBLICATIONS

XML Path Language, Clark et al, W3C Recommendation, Nov. 1999.*

"XML Path Language," Clark et al., W3C Recommendation Nov. 1999.*

"Apache HTTP Server Version 2.0: Authentication, Authorization and Access Control," http://httpd.apache.org/docs-2.0/howto/auth.html, pp. 1-5 and 1-4, Jan. 2004.

"X.509 Certificates and Certificate Revocation LIsts (CRLs)", Sun Microsystems, Inc., pp. 1-5, May 2001.

Aaron Skonnard, "Understanding SOAP", Web Service Basics: Understanding SOAP (SOAP Technical Articles), pp. 1-12, Mar. 2003.

Jeannine Hall Gailey, "Encrypting SOAP Messages Using Web Services Enhancements", Web Services Enhancements (WSE): Encrypting SOAP Messages Using Web Service Enhancements, pp. 1-14, Mar. 2003.

Mohan Rao Cavale, "Dynamic Groups in Windows Server 2003 Authorization Manager", pp. 1-6, Jan. 2003.

James Clark and Steve DeRose, "XML Path Language (XPath) Version 1.0", W2C Recommendation Nov. 16, 1999, pp. 1-37, Nov. 1999.

Park, et al., "An Efficient Stream Authentication Scheme", IEICE Trans. Inf. & Syst., vol. E86-D, No. 4, pp. 704-711, Apr. 2003.

Desmedt et al., "Perfectly Secure Message Transmission Revisited (Extended Abstract)", L.R. Knudsen (Ed.), Eurocrypt 2002, LNCS 2332, pp. 502-517, 2002.

Ren-Junn Hwang et al., "An Enhanced Authentication Key Exchange Protocol", Proceedings of the 17th International Conference on Advanced Information Networking and Applications (AINA '03), pp. 3, Mar. 2003.

Mohammed Al-Ibrahim and Josef Pieprzyk, "Authentication of Transit Flows and K-Siblings One-Time Signature", Advanced Communications and Multimedia Security, pp. 42-55. Sep. 2002.

Matei Ciobanu Morogan and Sead Muftic, "Certificate Management in Ad Hoc Networks", Department of Computer Science, Royal Institute of Technology, pp. 337-341, Jan. 2003.

David Geer, "Taking Steps to Secure Web Services", Technology News, IEEE Computer Society, pp. 14-16, Oct. 2003.

Daniel Fremberg, "The Mithra Authentication Protocol", Dr. Dobb's Journal, www.ddj.com, pp. 44-48, May 2003.

M. Looi, "Enhanced Authentication Services for Internet Systems Using Mobile Networks", IEEE Global Telecommunications Conference, pp. 3468-3472, Nov. 2001.

Matt Bishop, "What Is Computer Security?", IEEE Computer Society, pp. 67-69, Jan. 2003.

Kimitake Wakayama et al., "A Remote User Authentication Method Using Fingerprint Matching", Nagoya Institute of Technology, vol. 44, No. 2, pp. 401-404, Feb. 2003.

Bin-Tsan Hsieh et al., "On The Security of Some Password Authentication Protocols", Informatica, vol. 14, No. 2, pp. 195-204, 2003.

Chen Lin et al., "A Multi-Hierachy Model for Role-Based Control", Journal of Huazhong University of Science and Technology (Nature Science Edition), vol. 30, No. 2, pp. 102-104, Feb. 2002.

Yeubin Bai and Hidetsune Kobayashi, "New String Matching Technology for Network Security", IEEE, pp. 198-201, Mar. 2003.

Richard R. Rogoski, "Safe and Secure", Health Management Technology, www.healthmgttech.com, pp. 4, Dec. 2002.

Donald Beaver "Network Security and Storage Security: Symmetries and Symmetry-Breaking", IEEE, pp. 3-9, Dec. 2003.

Sylvia Osborn, "Database Security Integration Using Role-Based Access Control", Department of Computer Science, The University of Western Ontario, Ch. 22, pp. 245-257, Aug. 2000.

Wolfgang Essmayr and Edgar Weippl, "Identity Mapping—An Approach to Unravel Enterprise Security Management Policies", Software Competence Center Hagenberg, pp. 78-88, Aug. 2000.

Wei-qiang Sun et al., "A Stateful Multicast Access Control Mechanism for Future Metro-Area Networks", Electronic Networking Applications and Policy, vol. 13, No. 2, pp. 134-138, Third International Network Conference 2002; Jul. 2002.

Bertino, et al., "On Specifying Security Policies for Web Documents with an XML-Based Language", ACM, 2001, pp. 57-65.

Chatvichienchai, et al., "Translating Content-Based Authorizations for XML Documents", IEEE, 2003, pp. 10.

Vuong, et al., "Managing Security Policies in a Distributed Environment Using eXtensible Markup Language (XML)", ACM, 2001, pp. 405-411.

* cited by examiner

GENERIC SECURITY CLAIM PROCESSING MODEL

CROSS-REFERENCE TO RELATED APPLICATIONS

This application is related to U.S. patent application Ser. No. 10/779,922, filed Feb. 16, 2004, entitled "Security Scopes and Profiles".

FIELD

Various embodiments described below relate generally to security mechanisms for computing environments, more particularly but not exclusively to, authentication and authorization of messages.

BACKGROUND

Many message-based computing systems include security scheme for messages sent from one process (e.g. a piece of running software) to another process. Typically, such security schemes include an authentication mechanism in which the sender's "identity" is verified (e.g., checking a username/password) and an authorization mechanism in which the "actions" (e.g., accessing a resource) the sender is authorized to perform are determined. An access control mechanism can then be used to determine whether the message can then be allowed to proceed to the target process.

However, conventional message-based systems typically support only one security mechanism with a single level of security. Consequently, when a message is sent in a path having multiple security schemes (e.g., when the path has one or more intermediaries that use a different security scheme from that of the original sender), the security process can become complex (e.g., requiring the original sender to know the security scheme of each intermediary so that the message will meet the security requirements).

SUMMARY

In accordance with aspects of the various described embodiments, a system for processing multiple types of security schemes is provided. The system includes a server having a claims engine that extracts claim(s) from security token(s) and maps extracted claims to other claims. The term "claim" as used in this context is a statement about a token's subject. The claims engine can be selectively configured to extract claim(s) from one or more different types of security tokens corresponding to the multiple security schemes. The extracted claim(s) can then be selectively mapped to other claims. The security decision can then be based on the extracted and/or derived claim(s) rather than tokens. This aspect allows a system to support multiple security schemes and simplifies the security process, thereby providing a generic solution.

In another aspect, each claim is associated with a resource, and the security decision is to allow/deny access to the resource. The claims engine can be configured to determine the resource(s) being accessed by extracting or obtaining resource identifiers from a message at run-time (e.g., a property of the runtime environment), or by examining the static configuration of the service (e.g., a default resource). This aspect increases the flexibility/extensibility of the system.

In yet another aspect, the claims engine can send a return message to a sender of the message, with the return message including derived claims and/or information related to the location or accessing of derived claims. The sender can then send the derived claims or information pertaining to the derived claims in a subsequent message. This aspect eliminates the need for claim mapping on those subsequent messages, thereby reducing the amount of processing performed by the claims engine.

In still another aspect, the claims engine can be configured to selectively reject a claim (e.g., the server does not trust certificates from a particular certificate authority). This aspect increases the flexibility of the system.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Figure 1:
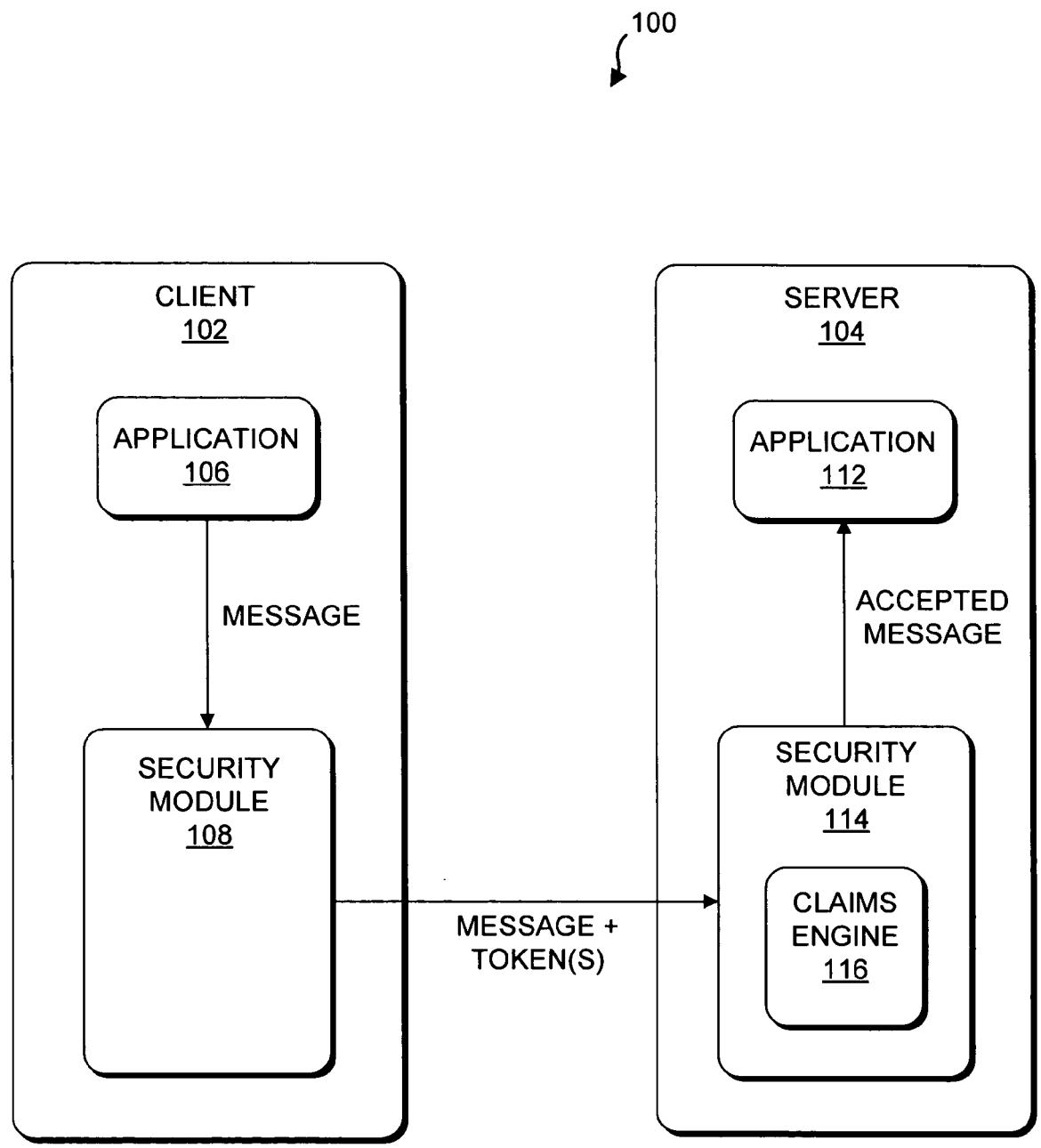
FIG. 1 is a block diagram illustrating a system using a generic security claim processing model according to one embodiment.

FIG. 1 is a block diagram illustrating a message-based system 100 that uses a generic security claim processing model for security processing of messages, according to one embodiment. In this example, system 100 includes a client 102 and a server 104. Client 102 and server 104, for example, can be different processes executing on a single computing platform, different units of code within the same process, or different nodes of a network, Client 102 includes an application 106 and a security module 108. Server 104 includes an application 112 and a security module 114. In accordance with this embodiment, security module 114 includes a claims engine 116 that implements the generic security claim processing model. The operation of claims engine 116 is described below in conjunction with FIG. 2.

Figure 2:
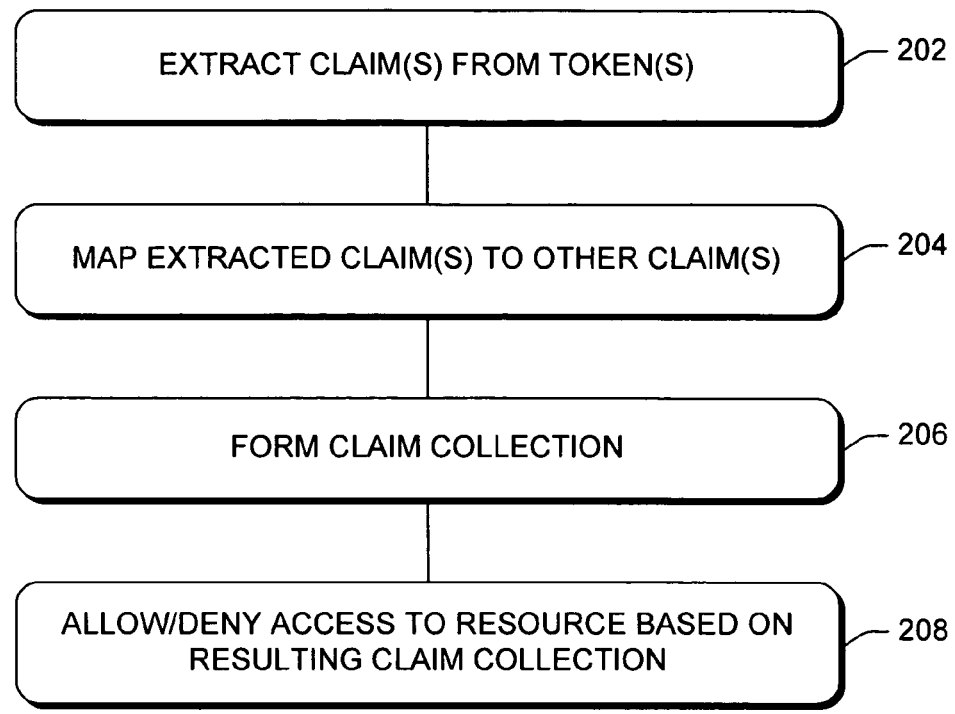
FIG. 2 is a flow diagram illustrating operational flow in the system of FIG. 1 in processing security claims, according to one embodiment.

FIG. 2 illustrates operational flow in claims engine 116 of system 100 (FIG. 1), according to one embodiment. Referring to FIGS. 1 and 2, system 100 processes a message as follows. Application 106 of client 102 generates a message to be sent to server 104. Security module 108 can then selectively perform security operations (e.g. encryption) of all or part of the message and can then add signed or unsigned security token (s) (e.g., username/password, X.509 certificates, Kerberos tickets, etc.) to the message. For example, the token can be a Kerberos ticket conforming to Kerberos release krb5-1.3.1, Oct. 24, 2003 (also referred to herein as the Kerberos Standard), and/or a X.509 certificate conforming with Internet X.509 Public Key Infrastructure Certificate Management Protocols, Apr. 15, 2003 (also referred to herein as the X.509 Standard). In some embodiments, the token(s) are sent "out-of-band" from that of the message. The token(s) typically include one or more claims, but may have no claims in some scenarios. The claim(s) that result from the mapping process are typically associated with a resource referred to within the message. For example, the resource may be identified by content in the message, determined at run-time, or a default resource that can be accessed by claims engine 116. The message and token(s) are then sent to server 104 (e.g., over a network). In some embodiments, the message and token(s) are sent using an eXtensible Markup Language (XML)-based protocol such as Simple Object Access Protocol (SOAP) version 1.2, W3C Recommendation 24 Jun. 2003. In other embodiments, any suitable messaging or communication protocol can be used.

In a block 202, claim(s) are extracted from the token(s). In this embodiment, claims engine 116 of security module 114 extracts the claim(s). As used herein, a claim is a statement about the subject of the security token asserted by either the subject itself or by another party about the subject and, as previously described, associated with a resource. There may be more than one claim associated with a resource. In one embodiment, a claim can be in the form of a "type" and a "value". For example, a claim extracted from a token can have a type of "X.509 Subject" and a value of "CN=John Doe, E=JohnDoe@xyz.com". Claims can also be used to assert a role assumed by or assigned to the subject of the token (e.g., the type can be "role" and the value can be "customer"). Claims can also be used to provide information about cryptographic keys owned by the subject, which also may have been used to encrypt or sign information contained in the message.

In a block 204, the extracted claim(s) are mapped to other claim(s). In this embodiment, claims engine 116 maps the extracted claim(s) into other claim(s), also referred to herein as "derived" claim(s). In some scenarios, claims engine 116 may not have mappings from the extracted claim(s) to other claim(s). Further, in some embodiments, the mapping definitions may include revocation of preselected claim(s). In one embodiment, these mappings are defined during configuration of server 104. For example, mapping(s) can be defined in a configuration file, in code, in scope and/or profiles (e.g., as described in aforementioned U.S. patent application Ser. No. 10/779,922 entitled "Security Scopes and Profiles"). Block 204 may be performed multiple times to ensure that all of the possible valid claim mapping(s) are found. For example, block 204 can be repeated until the derived claim(s) remain unchanged.

In a block 206, the extracted and derived claim(s) resulting from block 204 are collected so that they can be used in further processing. In this embodiment, these claim(s) are stored in-memory, but in other embodiments the resulting claim(s) can be stored in a file, database, etc.

In a block 208, the claim collection is used to allow/deny access to the resource(s) referred to in the message. In this embodiment, claims engine 116 tests the claim(s) to determine whether to allow/deny access, unlike conventional systems in which the access control decision is based on the token or other information specific to the message sender. This scheme allows for multiple security mechanisms to be used in the message path that has intermediaries and does not depend on the messaging system.

Although the above operational flow is described sequentially, in other embodiments, the operations described in the blocks may be performed in different orders, multiple times, and/or in parallel.

Example Scenario

For example, employee John Doe of XYZ Company wishes to purchase an item that is available from an "on-line" retailer for work-related purposes. XYZ Company in this example has created an entity (i.e., an intermediary) through which employees authorized to make "Internet purchases" may request items via an intranet and the company will then order and pay for the item over the Internet. Employee John Doe can send the request (which includes the Universal Product Code or UPC of the desired item) via client 102 to the intermediary (i.e., server 104 in this example) along with, for example, a Windows® Kerberos token (which is a token that contains a claim in which the type is "group membership" and the value is "full-time employees"). The intermediary can then perform block 202 to extract this claim from the token.

The intermediary can then attempt to map the claim to another claim. In this example, the intermediary (i.e., server 104) can map claims having a type "group membership" and the value "full-time employees" to another claim in which the type is "role" and the value is "purchaser", which is defined for employees that are authorized to make Internet purchases. Thus, for example, claims engine 116 can perform block 204 to determine whether the value of "full-time employees" of type "group membership" can be mapped to the claim having the type "role" and the value "purchaser". This claim can be defined during the configuration of the intermediary. The intermediary can then perform block 206 to form both of these claims into a collection.

The intermediary can then determine whether to send the purchase request to the on-line retailer using the claim collection. For example, the intermediary can perform block 208 to determine whether the claims associated with the message have a "role" with a value of "purchaser". In this example, John Doe is a "purchaser" and, thus, claims engine 116 will allow the message to be sent to the application (or infrastructure) that sends the purchase order to the on-line retailer.

Continuing the example, the intermediary can then become the "client" and the on-line retailer can become the "server". The intermediary can send a message (with the purchase order) along with, for example, an X.509 token, which the retailer can then attempt map into a claim of approved customers before processing the purchase order. The message sent by the intermediary can include all or some of the claims resulting from John Doe's message to the intermediary.

In another embodiment, system 100 operates substantially as described above, but with the additional operation of sending back to client 102 one or more derived claim(s), if any, or location information for where these derived claim(s) are stored in server 104. In some such embodiments, server 104 sends the derived claim(s) to client 102 using a message containing a time-bounded XrML (Extensible Rights Markup Language) license or SAML (Security Assertions Markup Language) assertion, which are both types of security tokens. For example, the message can be conformed by Extensible Markup Language (XML) Version. 1.0 (Third Edition) Feb. 4, 2004 or Security Assertion Markup Language (SAML) Version 1.1 Ratified as Oasis Standard, Sep. 23, 2003. This feature allows the client to include the additional derived claim(s) (or the location information) in the token(s) for subsequent messages. In scenarios having intermediaries, each intermediary can send its derived claims back to the original sender, or alternatively, the endpoint recipient can send all of the derived claims back to the original sender. In this way, performance can be improved by reducing the time/computation needed to perform blocks 204 and 206.

Exemplary Claims Engine

Figure 3:
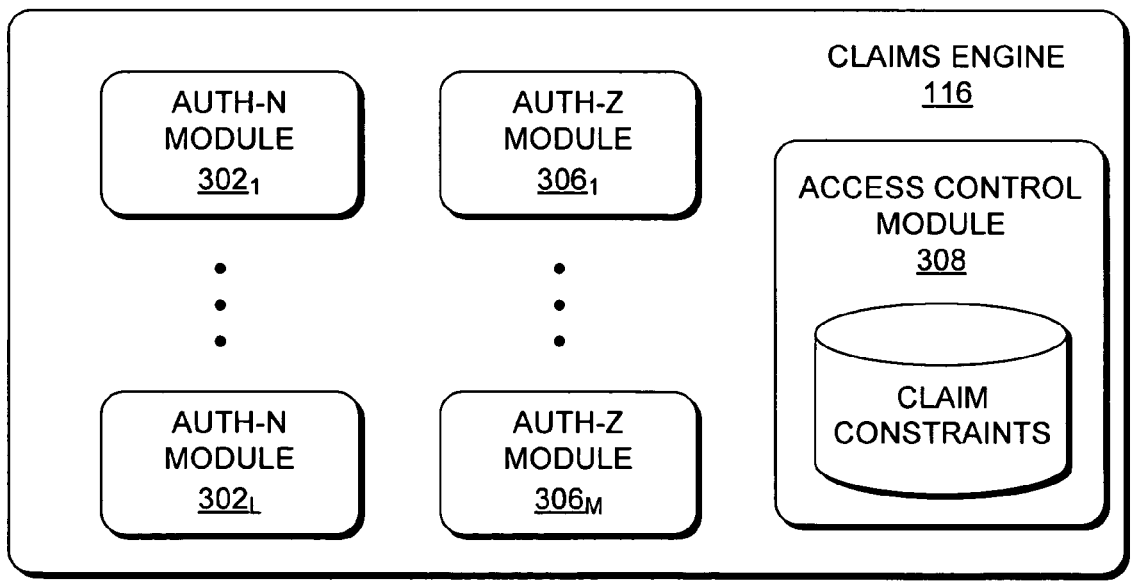
FIG. 3 is a block diagram illustrating exemplary modules of a claims engine, according to one embodiment.

FIG. 3 is a block diagram illustrating exemplary modules of claims engine 116 (FIG. 1), according to one embodiment. In this embodiment, claims engine 116 includes authentication (Auth-N) modules $302_1$-$302_L$, authorization (Auth-Z)

modules $306_1$-$306_M$, and an access control module 308. In one embodiment, Auth-N modules $302_1$-$302_L$ perform authentication operations (e.g., validates token(s) and/or trusts of token issuer(s)) for "L" different authentication mechanisms. For example, Auth-N modules $302_1$-$302_L$ can perform such authentication operations for: (1) X.509 tokens; (2) KERBEROS™ tokens (security services application programming interface); and (3) Username/Password tokens; as well as other tokens. In addition, in this embodiment, Auth-N modules extract claim(s) from tokens as described above in conjunction with block 202 (FIG. 2).

Auth-Z modules $306_1$-$306_M$, in one embodiment, perform claim mapping operations such as, for example, mapping extracted claims to other claims for "M" different mappings. For example, Auth-Z modules $302_1$-$302_L$ can perform claim mapping operations to: (1) identify claims; (2) group membership claims (e.g., as defined in WINDOWS SERVER 2003™ Authorization Manager); and (3) role claims; as well as other types of claims. In one embodiment, Auth-Z modules $306_1$-$306_M$ map claims to other claims as described above in conjunction with block 204 (FIG. 2). In addition, Auth-Z modules $306_1$-$306_M$, can map claims on a per resource basis. For example (continuing the above Internet purchase example), one of the Auth-Z modules can map the aforementioned employee's identity claim (John Doe) to the role claim (purchaser) for a resource (shopping cart: John Doe).

AC module 308, in this embodiment, performs access control operations as described above in conjunction with block 208 (FIG. 2). For example, AC module 308 can make the access control decision (e.g., allow/disallow the message to be further processed) by determining whether the message has an appropriate claim (either extracted or derived) for the resource(s) associated with the message (e.g., whether there is a role claim with value "purchaser" for a "shopping cart" resource).

In some embodiments, claims engine 116 also extracts resource(s) from the message. In one embodiment, claims engine 116 performs resource extraction before the claim mapping operations performed by the Auth-Z modules. For example, if the message is XML-based and supports XPath (e.g., XML Path Language Version 1.0, Nov. 16, 1999), AC module 308 can be configured to extract resource(s) contained in the message by evaluating an XPath expression against an XML message. AC module 308 can also be configured to extract a resource at run-time (e.g., determining the identifier for computing platform in which server 104 resides, domain, etc.). Still further, AC module 308 can be configured (e.g., by custom code) to determine a selected property of the message itself (e.g., size in bytes, a count of messages from the sender for the day, or other property that may not be accessible via XPath). Claims engine 116 may also have one or more default resources (e.g., setting a maximum purchase amount).

Figure 4:
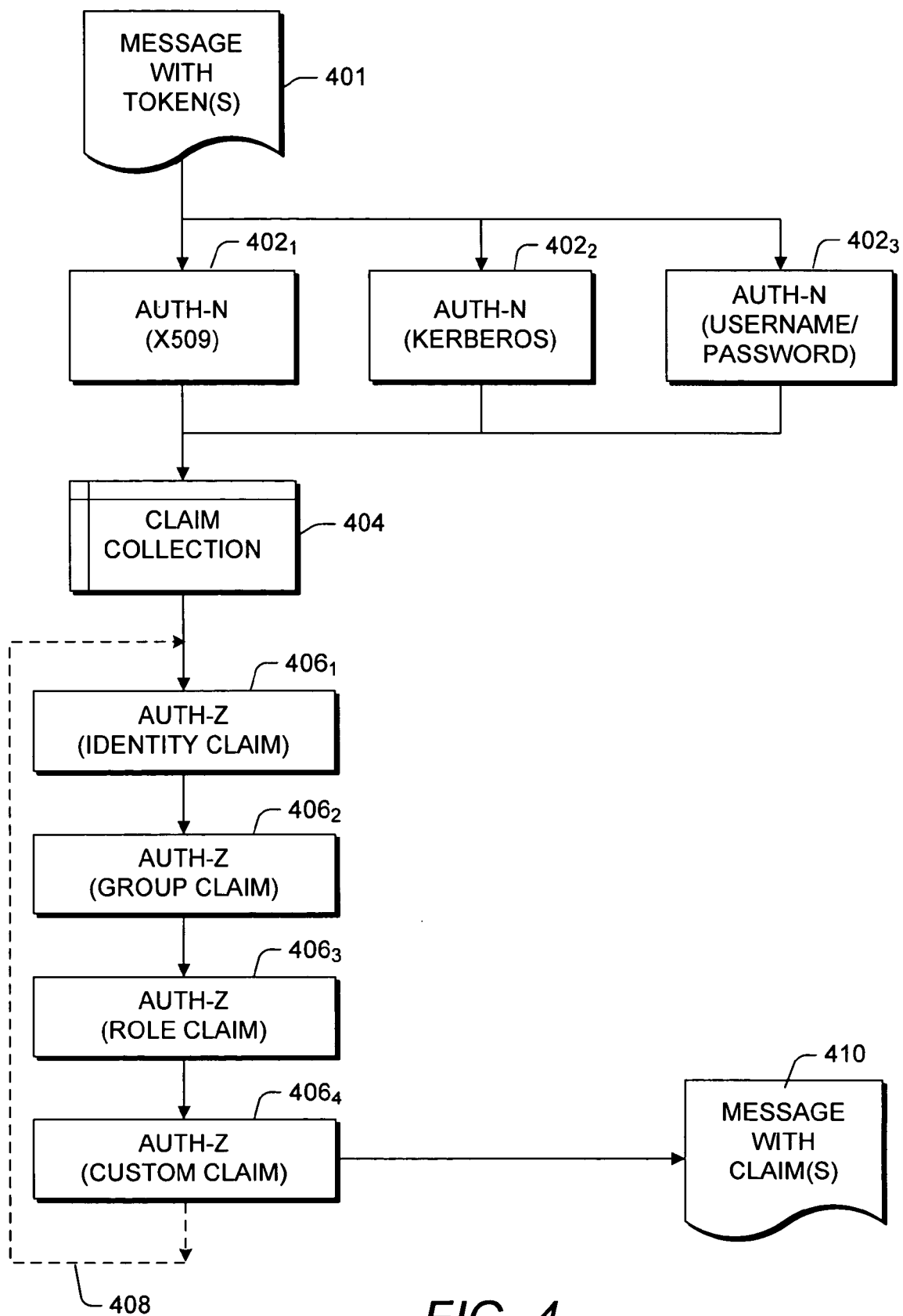
FIG. 4 is a flow diagram illustrating data flow in the claims engine of FIG. 3, according to one embodiment.

FIG. 4 is a data flowchart illustrating an example of data flow in claims engine 116 (FIG. 3), according to one embodiment. Referring to FIGS. 3 and 4, data flows through and is processed by claims engine 116 as follows. Claims engine 116 receives a message 401 from a client that may include one or more token(s). If message 401 does not have at least one token, the data flow essentially aborts. If message 401 does have one or more tokens, the token(s) are then processed by Auth-N modules $301_1$-$302_L$.

In this example, if message 401 includes an X.509 token, an Auth-N module (e.g., Auth-N module $302_1$) performs an authentication process $402_1$ that includes authentication operations in accordance with the X.509 Standard and, in addition, claim extraction operations as described above in conjunction with block 202 (FIG. 2). Similarly, if message 401 includes a Kerberos token, an Auth-N module (e.g., Auth-N module $302_2$) performs an authentication process $402_2$ that includes claim extraction operations and authentication operations in accordance with the Kerberos Standard. Likewise, if message 401 includes a Username/Password token, an Auth-N module (e.g., Auth-N module $302_3$) performs an authentication process $402_3$ that includes standard username/password authentication operations and the aforementioned claim extraction operations. In other embodiments, there may be more or less than three Auth-N modules, depending on the scenario.

The extracted claim(s), if any, are the grouped into a claim collection 404. Claim collection 404 is then operated on by Auth-Z modules $306_1$-$306_M$. As previously described, Auth-Z modules $306_1$-$306_M$ map claims into other claims, which may include revoking claim(s).

In this example, an Auth-Z module (e.g., Auth-Z module $306_1$) receives claim collection 404 and performs an authorization process $406_1$ in which Auth-Z module $306_1$ maps the received claim(s) into Identity claims, as previously described in conjunction with block 204 (FIG. 2). Claim collection 404 then contains the resulting extracted/derived claims.

Claim collection 404 is then received by another Auth-Z module (e.g., Auth-Z module $306_2$) in this example. Auth-Z module $306_2$ then performs an authorization process $406_2$ to map the extract/derived claims resulting from process $406_1$ into Group claims, which will then form part of claim collection 404.

Similarly, claim collection 404 is next received by another Auth-Z module (e.g., Auth-Z module $306_3$) in this example. Auth-Z module $306_3$ then performs an authorization process $406_3$ to map the extracted/derived claims resulting from processes $406_1$ and $406_2$ into Role claims. In some embodiments, there may be a custom Auth-Z module (not shown), which performs an authorization process $406_4$ to map extracted/derived claims into custom claims (e.g., claims that are specific to application 112).

Optionally, the claims may undergo authorization processes $406_1$-$406_3$ multiple times to ensure that all of the valid claim mappings have been made, as indicated by a dashed arrow 408 that loops back to authorization process $406_1$. As previously described, claims derived by the Auth-Z modules form part of claims collection 404. Claim collection 404 is then used to create message 410, which includes the claim(s) of claim collection 404 with or instead of the token(s). In other embodiments, there may be more or less than three Auth-Z modules, depending on the scenario.

Alternatively, extracted claims form claim collection 404 while derived claims (derived by the Auth-Z modules) can form another claim collection (not shown). These two claim collections are then used to create message 410, which includes the claim(s) of these claim collections with or instead of the token(s).

The various embodiments described above may be implemented in computer environments of the server and clients. An example computer environment suitable for use in the server and clients is described below in conjunction with FIG. 5.

Figure 5:
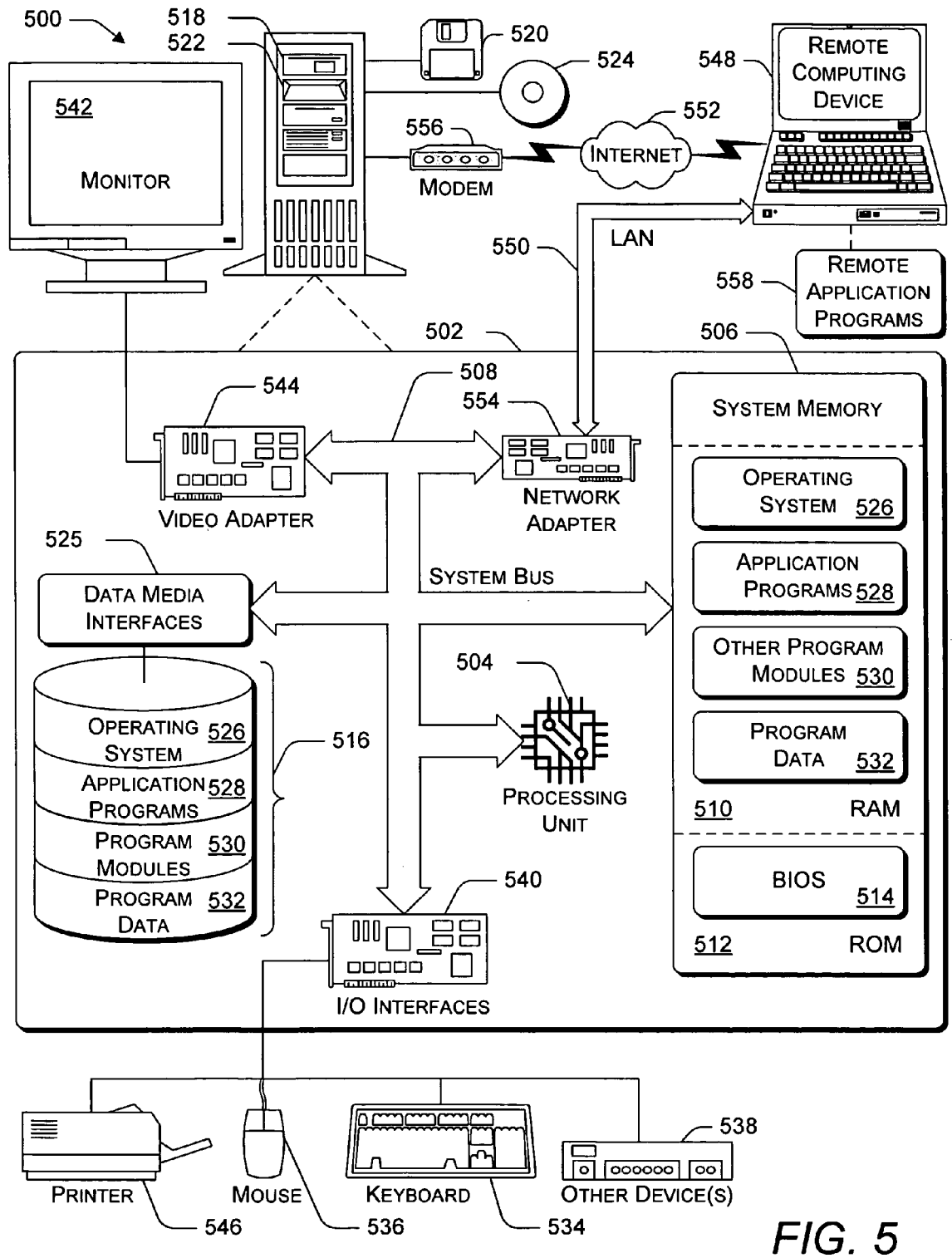
FIG. 5 is a block diagram illustrating an example computing environment suitable for practicing the above embodiments.

FIG. 5 illustrates a general computer environment 500, which can be used to implement the techniques described herein. The computer environment 500 is only one example of a computing environment and is not intended to suggest any limitation as to the scope of use or functionality of the computer and network architectures. Neither should the computer environment 500 be interpreted as having any dependency or requirement relating to any one or combination of components illustrated in the example computer environment 500.

Computer environment 500 includes a general-purpose computing device in the form of a computer 502. The components of computer 502 can include, but are not limited to, one or more processors or processing units 504, system memory 506, and system bus 508 that couples various system components including processor 504 to system memory 506.

System bus 508 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, a PCI Express bus, a Universal Serial Bus (USB), a Secure Digital (SD) bus, or an IEEE 1394, i.e., FireWire, bus.

Computer 502 may include a variety of computer readable media. Such media can be any available media that is accessible by computer 502 and includes both volatile and non-volatile media, removable and non-removable media.

System memory 506 includes computer readable media in the form of volatile memory, such as random access memory (RAM) 510; and/or non-volatile memory, such as read only memory (ROM) 512 or flash RAM. Basic input/output system (BIOS) 514, containing the basic routines that help to transfer information between elements within computer 502, such as during start-up, is stored in ROM 512 or flash RAM. RAM 510 typically contains data and/or program modules that are immediately accessible to and/or presently operated on by processing unit 504.

Computer 502 may also include other removable/non-removable, volatile/non-volatile computer storage media. By way of example, FIG. 5 illustrates hard disk drive 516 for reading from and writing to a non-removable, non-volatile magnetic media (not shown), magnetic disk drive 518 for reading from and writing to removable, non-volatile magnetic disk 520 (e.g., a "floppy disk"), and optical disk drive 522 for reading from and/or writing to a removable, non-volatile optical disk 524 such as a CD-ROM, DVD-ROM, or other optical media. Hard disk drive 516, magnetic disk drive 518, and optical disk drive 522 are each connected to system bus 508 by one or more data media interfaces 525. Alternatively, hard disk drive 516, magnetic disk drive 518, and optical disk drive 522 can be connected to the system bus 508 by one or more interfaces (not shown).

The disk drives and their associated computer-readable media provide non-volatile storage of computer readable instructions, data structures, program modules, and other data for computer 502. Although the example illustrates a hard disk 516, removable magnetic disk 520, and removable optical disk 524, it is appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on hard disk 516, magnetic disk 520, optical disk 524, ROM 512, and/or RAM 510, including by way of example, operating system 526, one or more application programs 528, other program modules 530, and program data 532. Each of such operating system 526, one or more application programs 528, other program modules 530, and program data 532 (or some combination thereof) may implement all or part of the resident components that support the distributed file system.

A user can enter commands and information into computer 502 via input devices such as keyboard 534 and a pointing device 536 (e.g., a "mouse"). Other input devices 538 (not shown specifically) may include a microphone, joystick, game pad, satellite dish, serial port, scanner, and/or the like. These and other input devices are connected to processing unit 504 via input/output interfaces 540 that are coupled to system bus 508, but may be connected by other interface and bus structures, such as a parallel port, game port, or a universal serial bus (USB).

Monitor 542 or other type of display device can also be connected to the system bus 508 via an interface, such as video adapter 544. In addition to monitor 542, other output peripheral devices can include components such as speakers (not shown) and printer 546, which can be connected to computer 502 via I/O interfaces 540.

Computer 502 can operate in a networked environment using logical connections to one or more remote computers, such as remote computing device 548. By way of example, remote computing device 548 can be a PC, portable computer, a server, a router, a network computer, a peer device or other common network node, and the like. Remote computing device 548 is illustrated as a portable computer that can include many or all of the elements and features described herein relative to computer 502. Alternatively, computer 502 can operate in a non-networked environment as well.

Logical connections between computer 502 and remote computer 548 are depicted as a local area network (LAN) 550 and a general wide area network (WAN) 552. Such networking environments are commonplace in offices, enterprise-wide computer networks, intranets, and the Internet.

When implemented in a LAN networking environment, computer 502 is connected to local network 550 via network interface or adapter 554. When implemented in a WAN networking environment, computer 502 typically includes modem 556 or other means for establishing communications over wide network 552. Modem 556, which can be internal or external to computer 502, can be connected to system bus 508 via I/O interfaces 540 or other appropriate mechanisms. It is to be appreciated that the illustrated network connections are examples and that other means of establishing at least one communication link between computers 502 and 548 can be employed.

In a networked environment, such as that illustrated with computing environment 500, program modules depicted relative to computer 502, or portions thereof, may be stored in a remote memory storage device. By way of example, remote application programs 558 reside on a memory device of remote computer 548. For purposes of illustration, applications or programs and other executable program components such as the operating system are illustrated herein as discrete blocks, although it is recognized that such programs and components reside at various times in different storage components of computing device 502, and are executed by at least one data processor of the computer.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. As a non-limiting example only, communication media includes wired media such as a wired network or direct-wired connection, and wireless media such as acoustic, RF, infrared, and other wireless media. Combinations of any of the above are also included within the scope of computer readable media.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

What is claimed is:

1. A method, performed by a computer processor executing computer executable instructions stored on a computer readable storage medium, of processing multiple types of security schemes, comprising:

receiving a message having a first token and a second token, wherein the first token and the second token are different from each other, while associated with a same subject;

extracting claims from one or more different types of security tokens corresponding to multiple security schemes, wherein each claim is a statement about each security token's subject that allows security schemes to be based on extracted claims;

authenticating the first token by extracting a first claim from the first token and authenticating the second token by extracting a second claim from the second token, wherein the first and second claims comprise different statements about the subject;

grouping the first and second claims into a claim collection by selectively mapping the first claim and the second claim to other claims;

determining a resource being accessed by extracting or obtaining resource identifiers from the message at runtime or examining a static configuration of a service;

authorizing access to the resource referred to in the message based at least in part on the first and second claims;

supporting multiple security schemes for the method; and the resource corresponds to at least one of the resource identifiers stored by a computing system.

2. The method of claim 1, further comprising obtaining another claim from the token.

3. The method of claim 1, further comprising rejecting the message as a function of the first claim.

4. The method of claim 1, further comprising rejecting the message as a function of the second claim.

5. The method of claim 1, wherein obtaining the resource from the message comprises applying an XPath expression.

6. The method of claim 1, wherein the resource identifier comprises a property of the message.

7. The method of claim 1, wherein the resource identifier comprises a property of the computing system's runtime environment.

8. The method of claim 1, further comprising sending a return message to a sender of the message, wherein the return message includes information regarding the second claim.

9. The method of claim 8, wherein the information regarding the second claim comprises the second claim.

10. The method of claim 1, further comprising obtaining a third claim from the first claim.

11. The method of claim 1, further comprising obtaining a third claim from the second claim.

12. The method of claim 1, further comprising selectively rejecting the first claim.

13. The method of claim 1, wherein the token is received out-of-band from the message.

14. The method of claim 1, further comprising sending the message, the first token and the second token to another entity, wherein the second token includes information related to the second claim.

15. A system configured to process multiple types of security schemes, the system comprising, one or more computer processors; and one or more computer readable storage media, storing computer executable instructions that are executable by the one or more computer processors, the computer executable instructions comprising:

a first module to extract claims from one or more different types of security tokens corresponding to multiple security schemes, wherein each claim is a statement about each security token's subject that allows security schemes to be based on the extracted claims;

the first module authenticates by extracting a first claim from a first token and a second claim from a second token associated with a message, wherein the message has an associated subject and the first claim and the second claim comprise different statements related to the subject;

a second module to selectively map the first claim and the second claim to other claims;

the second module to determine a resource being accessed by extracting or obtaining resource identifiers from the message at run-time;

the second module to authorize access to the resource referred to in the message based at least in part on the first and second claims;

the first module and the second module form a claim collection that includes the first and second claims;

the first module and the second module supporting multiple security schemes; and the resource corresponds to at least one of the resource identifiers stored by a computing system.

16. The system of claim 15 further comprising a third module to determine as a function of the first claim whether the message is to be rejected.

17. The system of claim 15, further comprising a third module to determine as a function of the second claim whether the message is to be rejected.

18. The system of claim 15, wherein the module to obtain the resource identifier from the message is to selectively apply an XPath expression to obtain the resource identifier.

19. The system of claim 15, wherein the resource identifier comprises a property of the message.

20. The system of claim 15, further comprising a module to selectively obtain a resource identifier from a computing system in which the first and second modules reside.

21. The system of claim 20, wherein the resource identifier comprises a property of the computing system's runtime environment.

22. The system of claim 15, further comprising a module to selectively send a return message to a sender of the message, wherein the return message includes information regarding the second claim.

23. The system of claim 22, wherein the information regarding the second claim comprises the second claim.

24. The system of claim 15, wherein the second module is to selectively obtain a third claim from the first claim.

25. The system of claim 15, wherein the second module is to selectively obtain a third claim from the second claim.

26. The system of claim 15, wherein the second module is to selectively reject the first claim.

27. The system of claim 15, wherein the first module is to receive the token out-of-band from the message.

28. The system of claim 15, further comprising a module to send the message, the first token and the second token to another entity, wherein the second token includes information related to the second claim.

29. A computer-readable storage medium storing computer-executable instructions that, executed by a processor, perform acts comprising:

receiving a message having a first token and a second token, wherein the first token and the second token are different from each other, but associated with a same subject;

extracting claims from one or more different types of security tokens corresponding to multiple security schemes, wherein each claim is a statement about each security token's subject that allows security schemes to be based on the extracted claims;

authenticating by obtaining a first claim from the first token and a second claim from the second token, wherein the first and second claims comprise different statements about the subject;

grouping the first and second claims into a claim collection by selectively mapping the first claim and the second claim to other claims;

determining a resource being accessed by extracting or obtaining resource identifiers from the message at runtime or examining a static configuration of a service;

authorizing access to the resource referred to in the message based at least in part on the first and second claims;

supporting multiple security schemes for the acts; and the resource corresponds to at least one of the resource identifiers stored by a computing system.

30. The computer-readable storage medium of claim 29, further comprising rejecting the message as a function of the first claim.

31. The computer-readable storage medium of claim 29, further comprising rejecting the message as a function of the second claim.

32. The computer-readable storage medium of claim 29, further comprising obtaining a resource identifier from the message.

33. The computer-readable storage medium of claim 29, further comprising obtaining a resource from a computing system reading the machine-readable medium.

34. The computer-readable storage medium of claim 29, further comprising sending a return message to a sender of the message, wherein the return message includes information regarding the second claim.

35. The computer-readable storage medium of claim 29, further comprising obtaining a third claim from the first claim.

36. The computer-readable storage medium of claim 35, further comprising rejecting the message as a function of the third claim.

37. The computer-readable storage medium of claim 29, further comprising obtaining a third claim from the second claim.

38. The computer-readable storage medium of claim 29, further comprising selectively rejecting the first claim.

39. The computer-readable storage medium of claim 29, further comprising sending the message, the first token and the second token to another entity, wherein the second token includes information related to the second claim.

* * * * *